United States Patent Office 3,255,286
Patented June 7, 1966

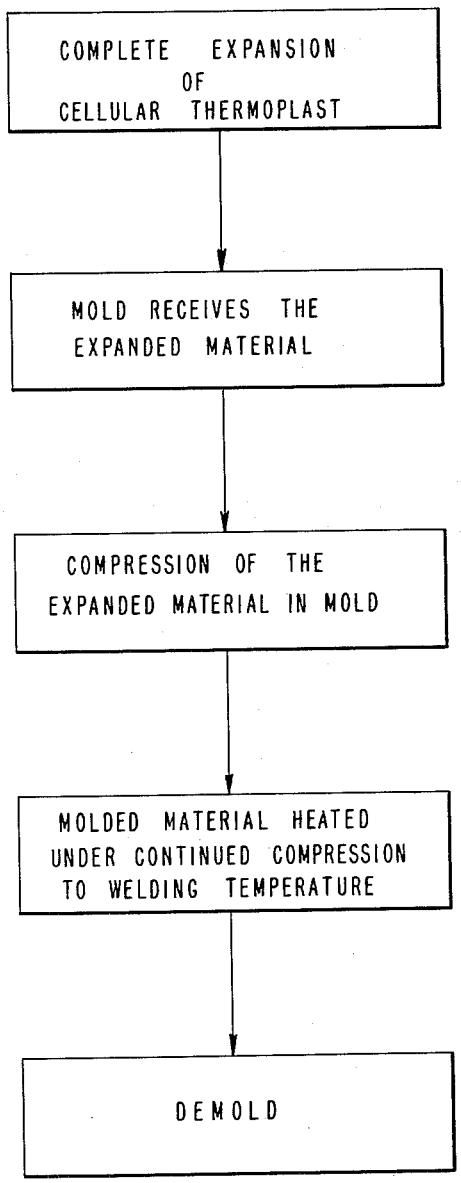

3,255,286
PRODUCTION OF SHAPED ARTICLES FROM CELLULAR THERMOPLASTIC MATERIALS
Stéphane Luc-Belmont, Clermont-Ferrand, France, assignor to Les Produits Synthetiques Appliques, Chambray les Tours, France, a French corporation
Filed Oct. 16, 1962, Ser. No. 230,996
Claims priority, application France, Oct. 20, 1961, 876,577
4 Claims. (Cl. 264—109)

The present invention concerns the manufacture of articles such as shaped pieces, blocks, plates, sheets, strips, etc. from elements made of a heat-weldable cellular material such as spherules, pellets, beads, flakes, etc.

The process according to the present invention consists in welding together the cellular elements by heating them up to their softening temperature and compressing them, said compression originating outside said elements, so as to reduce the space originally filled by the said cellular material with correlative increase of its density.

The process is illustrated by the flow diagram of the accompanying drawing.

Under the joint action of compression and heat, the elements of cellular material agglomerate to form cellular products of homogeneous appearance, taking the shape imparted by the shaping apparatus, such as moulds, rollers, and dies, used in the shaping process.

The elements used in the working-out of the invention may be made of a cellular material obtained through any conventional process and particularly of a thermoplastic material made cellular by complete expansion and therefore free of any trace of expanding agent.

The process of the present invention differs from known processes of agglomerating elements of thermoweldable material by expansion, e.g. in a closed mould, in that, in known processes, the pressure required for agglomeration originates in the expansion of the elements by the volatilization of the expanding agent, whilst in the process according to the present invention the pressure needed for the agglomeration originates outside the cellular elements.

One of the advantages of the present invention is to produce a material which, not having to sustain any stress or deformation due to the presence of residual expanding agent, shows greater dimensional stability and physical inertia than those of similar cellular products which have been agglomerated by means of their expanding power.

It is known that cellular elements, such as partly expanded granules, can only be agglomerated after they have been left to age for a determined period of time, which should neither be reduced if the finished article is to be homogeneous nor prolonged if the expanding capacity of the granules, necessary to produce the pressure required for shaping the article, is not to be reduced. This entails a technical difficulty that makes manufacture more difficult and increases financial investments due to the necessity of providing storage facilities where the material is kept for ageing. On the contrary, the cellular elements used in the process according to the present invention, being wholly expanded and inert, may be used either immediately after expansion or after storage or transport of any duration as well.

The compression may be obtained by any mechanical, pneumatic or hydraulic means, or, particularly by means of a mould whose lid may be moved parallel to itself, like a piston, but compression may also be obtained in a mould of constant volume through pneumatic compression of the material.

The heating required to bring the material to its softening point may be produced by any means such as steam, infra-red rays, high frequency, etc.

The invention will now be illustrated by means of examples.

Example 1

Pellets or beads of cellular polystyrene previously completely expanded in free air are introduced into a mould whose walls are perforated and whose lid may slide parallel to itself like a piston. Once the mould has been entirely filled up with such pellets or beads, the lid is forced into the mould by pressure so as to reduce the space filled by the pellets or beads by circa 20 to 30 percent.

Heating is then carried out by passing steam under pressure in the orifices of the mould. The highly compressed particles soften and weld together so as to form a cellular mass of homogeneous appearance which may then be unmoulded.

Example 2

Scraps of cellular polystyrene, completely expanded in a former treatment, are introduced into a perforated wall mould closed by a hinged lid. The mould also contains a bladder inflatable from the outside. When the mould is filled up, the lid is locked and the bladder is inflated by the injection of compressed air. The increase of bladder volume causes a decrease of the volume of the space previously filled with the scraps of cellular material. The mould is then heated with infra-red rays. The heating causes the compressed scrap particles to weld together. The product may then be unmoulded and an article of homogeneous appearance is obtained.

Example 3

A mould, previously closed, is provided with an orifice connected with the nozzle of an injection syringe filled up with essentially spherical granules previously completely expanded. These granules are injected into a mould, by means of compressed air, under such a pressure that the density of the granules is appreciably increased by the compression. The inlet orifice is then shut and the mould is heated by immersion in boiling water, which causes the welding of the granules together, the disappearance of gaps between them, and finally leads to the production of a cellular article of homogeneous appearance.

Example 4

Pellets or beads of completely expanded cellular polystyrene are introduced into the feeding funnel of a calendering apparatus whose rolls are heated and 20 millimeters apart. The pellets or beads are both compressed and heated between the cylinders. The joint action of heat and pressure welds the pellets or beads together to produce a supple sheet of cellular material.

Example 5

Rigid sections of cellular material for insulation of pipings are prepared in the following way:

An annular mould provided with a piston is used. One of the ends of the mould communicates with a loading funnel and the other end may be closed by a suitable closure. Once the closure has been closed, a load of completely expanded pellets of cellular material, such as polystyrene, are fed into the mould through the funnel. The mould is then submitted to steam heating whilst the actuation of the piston compresses the material in the mold to about one-half of its original volume. The closure is then opened and another stroke of the piston ejects the annular, cellular, rigid section from the mould.

The rigid section is then cut along a diametrical plane so as to obtain the two half sections for insulation.

*Example 6*

The procedure is similar to that of Example 5 but the material in this case is compressed between the moving piston and the material previously shaped by the preceding piston stroke and restrained in its translation by its friction against the walls of the shaping device. Continuous production of parts by means of discontinuous stepwise compression is obtained in this way.

*Example 7*

Completely expanded spherules of cellular polystyrene are fed into a screw extruder whose temperatures are set so as to bring the material to its softening temperature.

The extrusion so obtained by joint action of screw-pressure and heating causes the agglomeration of the spherules through heat-welding and the formation of an endless rope of cellular polystyrene.

In the previous examples the treatment of expanded polystyrene has been considered but it must be understood that the process according to the present invention may be applied to all heat-weldable cellular materials generally, provided the working conditions have been adjusted in each case and especially the heating temperature has been adjusted to the nature of the material treated so as to obtain agglomeration by heat-welding. The compressive strength put in operation will be determined by the desired increase of density of the cellular material.

As indicated above, the elements of cellular material utilized may appear as granules, pellets, beads, flakes, and even as scrap.

Mixtures of such elements may also be used. Fillers such as for instance cork scrap, mineral particles, etc. may also be added to the cellular material.

What is claimed is:

1. The method of producing shaped cellular articles from elements made of cellular polystyrene which comprises causing discrete particles of cellular polystyrene to be expanded in free air and freed of residual expansion agent, and welding said particles together by heating them to their softening temperature and compressing them so as to reduce the space filled by said particles to achieve the density required in the final product.

2. The method of producing shaped cellular articles from elements made of cellular thermoplastic materials which comprises causing discrete particles of cellular thermoplastic material to be expanded in free air and freed of residual expansion agent, and welding said particles together by heating them to their softening temperature and compressing them so as to reduce the space filled by said particles to achieve the density required in the final product.

3. The method of claim 2 in which the pressure substantially eliminates voids within the article.

4. The method of claim 2 in which the pressure reduces the sizes of the cells in the material.

References Cited by the Examiner

UNITED STATES PATENTS

| | | | |
|---|---|---|---|
| 2,333,565 | 11/1943 | Hawk | 264—321 XR |
| 2,339,458 | 1/1944 | Champney | 18—48 |
| 2,829,117 | 4/1958 | Lindmann | 264—51 XR |
| 2,878,153 | 3/1959 | Hacklander. | |
| 2,994,110 | 8/1961 | Hardy | 264—321 XR |
| 3,004,293 | 10/1961 | Kreidl. | |
| 3,026,574 | 3/1962 | Takacs et al. | 264—53 XR |
| 3,058,162 | 10/1962 | Grabowski | 264—53 |
| 3,080,612 | 3/1963 | Buchman. | |
| 3,118,176 | 1/1964 | Freedman et al. | 264—53 XR |
| 3,131,426 | 5/1964 | Legler | 264—321 XR |

FOREIGN PATENTS

| | | |
|---|---|---|
| 623,804 | 7/1961 | Canada. |
| 360,481 | 4/1962 | Switzerland. |

OTHER REFERENCES

Stastny, Fritz, "Molds and Fixtures for Styropor Fabrication," translation of BASF booklet ("Forman and Vorrichtygen sur Verarbeitung von Styropor," reprint from Der Plastverarbeiter 5, No. 9, 12 pp.), 1954, all pages. Copy in Group 150.

ALEXANDER H. BRODMERKEL, *Primary Examiner.*

MORRIS LIEBMAN, *Examiner.*

P. E. ANDERSON, *Assistant Examiner.*